No. 687,501. Patented Nov. 26, 1901.
H. HELD.
VAULT LIGHT.
(Application filed Apr. 12, 1901.)
(No Model.)

WITNESSES:

INVENTOR
H. Held
by
his ATTORNEY.

UNITED STATES PATENT OFFICE.

HENRY HELD, OF BROOKLYN, NEW YORK.

VAULT-LIGHT.

SPECIFICATION forming part of Letters Patent No. 687,501, dated November 26, 1901.

Application filed April 12, 1901. Serial No. 55,476. (No model.)

*To all whom it may concern:*

Be it known that I, HENRY HELD, a citizen of the United States, and a resident of the city of New York, borough of Brooklyn, in the county of Kings and State of New York, have invented certain new and useful Improvements in Vault-Lights, of which the following is a specification.

This invention relates to improvements in vault-lights; and the object of my invention is to provide a new and improved vault-light which is simple in construction, strong, and durable and in which the lenses are held securely.

Figure 1:
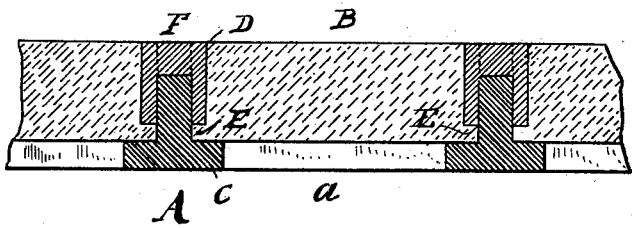
Figure 2:
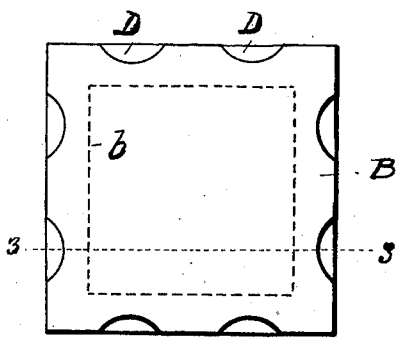
Figure 4:
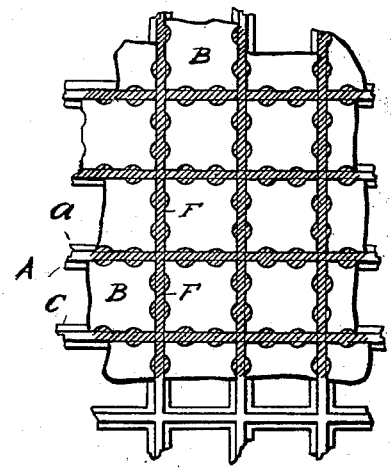
Figure 3:
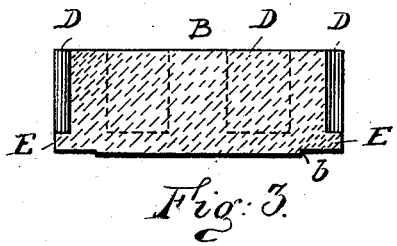

In the accompanying drawings, in which like letters of reference indicate like parts in all the views, Figure 1 is an enlarged vertical sectional view through the lenses and part of the supporting-frame. Fig. 2 is a plan view of one of the glass lenses. Fig. 3 is a vertical sectional view of the same on the line 3 3 of Fig. 2. Fig. 4 is a plan view of part of a vault-light, some lenses being broken away and others omitted entirely.

The supporting-frame A is made in conventional manner of cast-iron, with square fields *a* for receiving the lenses B, which fit in the fields *a* and rest on the bottom flanges C of the bars forming the grating or frame A. As shown in Fig. 3, the lenses B may be provided on the under side with rabbets *b*, fitting on the edges of the flanges C, those parts of the lenses between the rabbets *b* and the edges of the lenses resting upon the flanges C.

The lenses B are rectangular in shape and, as stated, fit in the squares or rectangular recesses in the supporting-frame or grating A, and the sides of the lenses are at right angles to the top and bottom faces, in contradistinction to lenses having sides which slope or incline from top to bottom or bottom to top.

Each side of the glass lens of my improved vault-light is provided with one or two vertical grooves D, extending from the top surface to within a short distance from the bottom surface of the lens, whereby a short lateral lug E is formed at the bottom of each groove, but does not project beyond the side of the lens.

After the lenses B have been placed upon the frame or grating A the spaces between the sides of the lenses are filled in with cement or like substance, as shown at F in Figs. 1 and 4, and this cement also fills the grooves D and rests upon the lugs E and thus by bearing down on these lugs assists materially in holding the lenses in place. At the same time the grooves D do not decrease the effective light area of the lenses to any appreciable extent.

Having described my invention, what I claim as new, and desire to secure by Letters Patent, is—

In a vault-light, the combination with a supporting-frame or grating, having rectangular spaces for receiving glass lenses, of lenses in said spaces, which lenses have their sides at right angles to their top and bottom faces and have grooves in their sides which grooves extend from the top faces to within short distances from the bottom faces and form lateral lugs at the bottom of the lenses, the outer edges of said lugs being flush with the straight sides of the lenses, and a cement filling between the sides of the lenses, in the grooves and upon the said lugs, substantially as herein shown and described.

Signed at New York city, borough of Brooklyn, in the county of Kings and State of New York, this 4th day of April, A. D. 1901.

HENRY HELD.

Witnesses:
HENRY LEMP,
GEORGE REITTER.